FIGS. 7A and 7B illustrate another embodiment of the record medium according to the invention. In the present embodiment, the record medium 63 comprises a plurality of recording regions 66 formed concentrically about a rotating center axis 64 and in each region, a plurality of tracks are formed concentrically or spirally and one of these tracks is used as the guide track 65. That is to say, each tracks 65, 67, 69 and 71 formed in respective regions 66, 68, 70 and 72 are used as the guide track. These guide tracks are separated from each other by a distance D. When the information tracks are recorded with a constant pitch d, in a respective region there may be formed $((D/d)-1)$ information tracks. Further in the present embodiment, each information track is divided in a circumferential direction by a constant angle $\theta$ to form a plurality of sectors 90 each of which is denoted by radial and circumferential address signals. These address signals as well as the track address signal and the synchronizing clock signal necessary for reproducing the sector addresses are recorded in the guide tracks 65, 67, 69 and 71 in the form of optically readable pits. These additional information signals are read out optically by means of the tracking light beam and the position of the recording or reproducing light spot with respect to the tracking light beam spot is controlled by the read out address signal. Then, the extremely high speed random access can be effected.

FIG. 8 is a schematic view illustrating an embodiment of the apparatus according to the invention which can effect the above mentioned random access by means of the record medium shown in FIGS. 7A and 7B.

Also in this embodiment, light beams emitted from tracking light source 81 and recording and reproducing light source 82 are focussed onto an information record medium 84 by means of a common optical system 88 including a common objective lens 83. Further, the tracking light beam is controlled by a tracking and focussing servo mechanism to follow the guide track precisely and the recording or reproducing light beam is controlled by a swingable mirror 85 so as to follow the information track accurately. That is to say, the inclination angle of the recording or reproducing light beam with respect to the tracking light beam is adjusted by rotating the swingable mirror 85 so that the distance between the recording or reproducing light beam spot and the tracking light beam spot on the record medium 84 is maintained to a given value. Moreover, the tracking error signal, focussing error signal and the information signal can be derived from the output signal from light detectors 33 and 37 in the same manner as that explained with reference to the previous embodiments. The light sources 81, 82, the objective lens 83, the swingable mirror 85 and the light detectors 33 and 37 as well as remaining optical elements and the tracking and focussing servo mechanisms are arranged in an integral body constituting an optical pick-up 89 which may be moved in the radial direction of the disc-shaped record medium 84.

Now the recording operation will be first explained. It is assumed that the radial addresses N, the circumferential addresses M, the synchronizing signal, etc. have been previously recorded in the guide tracks of the record medium 84, and the tracking light beam is tracing an N'th guide track. The position of the pick-up 89 with respect to the guide track is effected by a pick-up position control circuit 101 and the deviation of the tracking light beam spot with respect to the guide track is corrected by moving the objective lens 83 in the radial direction under the control of a tracking actuator driving circuit 102. The output signals from the light detector 37 are supplied to a differential amplifier 103 to generate the tracking error signal which is supplied to the tracking actuator driving circuit 102 to effect the tracking servo control. Therefore, when the tracking ight beam spot is deviated from the guide track, the objective lens 83 is driven in the radial direction so that the deviation can be compensated for. The output signals from the light detector 37 are summed up by an adder 104 to derive the additional information signal recorded in the relevant guide track. The additional information signal thus derived is supplied to a decoder 105 including a buffer and a synchronous detector 106. In the decoder 105, the sector addresses N' and M' are reproduced and in the synchronous detector 106 the synchronizing signal, i.e. the clock signal is regenerated. The synchronizing signal is supplied to a motor control circuit 114 which controls the rotation of the record medium 84.

It is now assumed that a sector having sector addresses N, n and M is to be accessed. In this case, the addresses N, n and M are supplied externally from an input terminal 107 to an address memory 108 and are stored therein. At first the coarse radial address N denoting the recording region number is compared with the read out radial address N' in a comparator 109 which produces an output signal corresponding to a difference between the addresses N and N'. This output signal is supplied to the pick-up position control circuit 101 to move the pick-up 89 in the radial direction until the tracking light beam scans the Nth guide track.

The fine radial address n representing the information track number in the relevant recording region is supplied to a mirror control driving circuit 110 to move the swingable mirror 85 until the distance between the recording light beam spot and the tracking light beam spot becomes a given value corresponding to the fine radial address n. In this manner, the recording light beam can be controlled to scan a desired information track defined by the radial addresses N and n.

At the same time, the circumferential address M' read out of the guide track is compared with the externally supplied circumferential address M in a comparator 111. When the comparator 111 detects an identification between these addresses M' and M, it produces an output signal to a recording signal buffer 112 including a gate circuit. The information signal to be recorded is supplied from an input terminal 113 to the buffer 112 and the buffer supplies selectively the information signal to a laser driving circuit 114 under the control of the identification signal form the comparator 111 and the synchronizing signal from the detector 106. Then the recording and reproducing laser light source 82 is driven by the information signal for a correct time interval and the information signal is recorded in the given sector denoted by the externally supplied addresses N, n and M along a concentric or spiral track constituted by an array of optically readable pits.

During reproduction, the recording and reproducing laser light source 82 is driven into a continuously oscillating mode to emit the laser light beam having a constant intensity. The light beam reflected by the record medium 84 is received by the light detector 33 and an output information signal from the light detector is amplified by an amplifier 116. The amplified informa-

PRIOR ART
FIG. 1A

OBJECTIVE LENS DRIVE DEVICE WITH TRACKING ERROR CORRECTION WITH FLUX OF OPPOSITE DIRECTION

BACKGROUND OF THE INVENTION

The present invention relates to an objective lens drive device for driving an objective lens perpendicularly to the optical axis and a data track, in order to correct relative misalignment between the data track and a light spot which is projected by the objective lens, that is, to correct the tracking error, in a device for reading out data by projecting a readout light spot on the data track in which data is recorded spirally or coaxially on a recording medium.

The data readout device of the type described above is conventionally known. For example, a recording medium which has data tracks is called a video disk. The video disk in which the encoded video and audio signals are recorded as optical data such as optical transmission, reflection, and phase characteristics, is rotated at a high speed while a laser beam radiated from a laser source is focused on the video disk. Thus, the optical data is read out. One of the features of this recording medium is the high recording density of the data, so that the respective tracks are very narrow and the spaces between the tracks are also narrow. Accordingly, the diameter of the readout light spot is extremely small. In order to correctly read out original data on data tracks whose track and pitch are narrow, relative misalignment between the readout light spot and the data track, that is, tracking error, must be reduced to the minimum. Conventionally, for this purpose, the relative misalignment between the readout light spot and the data track is detected. Based on the detected tracking error signal, the readout light spot is displaced along the width of the data track to achieve the desired tracking control. For example, a tracking control mechanism is proposed in which a vibration mirror is disposed in the light path between the laser source and the objective lens, and the mirror is rotated by a tracking error signal. However, with this tracking mechanism, it is difficult to obtain a satisfactorily precise device which is compact in size and low in cost.

For eliminating the drawbacks described above, a method is proposed in which an elastic supporting member comprising a leaf spring supports the objective lens or its holding frame and the objective lens is displaced perpendicularly to the optical axis and the data track, according to the tracking error signal. In a drive device using this leaf spring, a system utilizing an electromagnet, a voice coil system or a system utilizing a piezoelectric element is proposed to displace the objective lens. However, the drive device must be small in size and light in weight in order to maintain excellent response characteristics of the tracking. Further, in practice, a focusing error resulting from incorrect focusing of the light spot on the data track, in addition to the tracking error, occurs in the device. In order to correct this focusing error, a focusing mechanism which displaces the objective lens in the direction of the optical axis is also required. When the tracking mechanism is mounted on the focusing mechanism, the tracking mechanism must be small in size and light in weight for performing excellent focusing correction. When a device utilizing an electromagnet is used, the necessary driving force can be obtained and the device is relatively easily made compact and light. However, the relation between the current flowing through the electromagnetic coil and the displacement of the objective lens becomes nonlinear, making simple correction of the tracking error impossible. In the case of a device with a voice coil system, the device cannot be made compact and light in weight. When a device utilizing a piezoelectric element is used, the necessary driving force cannot be obtained.

In order to eliminate the drawbacks described above, the present applicant proposed an objective lens drive device in U.S. patent application Ser. No. 217,117 filed on Dec. 17, 1980, now U.S. Pat. No. 4,386,823, issued June 7, 1983. In this device, the necessary driving force drives the objective lens linearly by the tracking error signal. In particular, the device performs two-dimensional driving of the objective lens and is small in size and light in weight.

FIGS. 1A and 1B show arrangements and principles of operation of drive means of objective lens drive devices. In an example shown in FIG. 1A, first and second stationary yokes 2 and 2' are connected to a permanent magnet 1, and a magnetic circuit shown by arrow A is formed. A movable member 5 constituted by a magnetic body is movably disposed in the direction shown by arrow B in a gap between the first and second yokes 2 and 2'. First and second coils 4 and 4' are wound around the first and second yokes 2 and 2', respectively. If leakage of the magnetic flux is not considered, only the opposing surfaces 4A and 4A' of the first and second coils 4 and 4' are in the magnetic field which is formed by the permanent magnet 1. In other words, if it is assumed that the cross section of the yokes 2 and 2' is square, the three respective surfaces of the yokes 2 and 2' other than the opposing surfaces are not crossed by lines of the magnetic flux. In this way, when a current flows through a coil in the magnetic field, the coil is subjected to a force. When a current flows through the first and second coils 4 and 4' so that the coil portions 4A and 4A' are urged in the same direction (current flowing as shown in the symbol in FIG. 1A), the coils 4 and 4' do not move since they are wound around the stationary yokes. The movable magnetic body 5 moves under the force in one of the directions shown by the arrow B; for example, to the left. When the current flows through the coils 4 and 4' in the reverse direction, the movable magnetic body 5 moves in the opposite direction, that is, to the right.

Referring to FIG. 1B, the first and second stationary yokes 2 and 2' are connected to a third stationary yoke 3 in place of the permanent magnet. A movable member 6 constituted by a permanent magnet is disposed in a gap between the first and second yokes 2 and 2' and moves in the direction shown by the arrow B in order to generate the magnetic flux through the yokes. A magnetic circuit shown by the arrow A is thus formed. As in the case described above, when a current flows through the first and second coils 4 and 4' which are wound around the first and second stationary yokes 2 and 2', the movable member 6 can be displaced in the direction shown by the arrow B. The first, second and third stationary yokes 2, 2' and 3 may be integrally formed, or the third yoke 3 may be replaced with a permanent magnet as shown in FIG. 1A.

FIGS. 2A and 2B and FIGS. 3A and 3B show arrangements of an objective lens drive device in which pairs of the respective drive means shown in FIGS. 1A and 1B oppose each other so that the magnetic flux distribution becomes symmetrical about a plane defined by the optical axis of an objective lens and longitudinal data tracks. An objective lens 7 is mounted to a lens holding frame 8 which is constituted by a nonmagnetic body, and movable members 5-1 and 5-2 constituted by magnetic bodies (FIGS. 2A and 2B) and movable members 6-1 and 6-2 constituted by permanent magnets (FIGS. 3A and 3B) are respectively attached to the holding frame 8 so as to make the magnetic flux distribution symmetrical about the plane defined by the optical axis of the objective lens 7 and the longitudinal data tracks. One end of a leaf spring 9 and one end of a leaf spring 9' which is paired therewith are disposed symmetrically about the plane described above and are mounted to the movable members 5-1, 5-2, 6-1 and 6-2. The other ends of these leaf springs are mounted respectively to stationary members 10 and 10' and support the objective lens or the like so that the objective lens or the like is movable in the direction shown by the arrow B. Two pairs of the drive means are opposed to each other and cooperate with the movable members 5-1, 5-2, 6-1 and 6-2. Respective arrangements of the paired drive means are the same as in FIGS. 1A and 1B. The stationary yokes 2, 2' and 3 are integrally formed in FIGS. 3A and 3B.

When a current flows through the first and second coils 4 and 4' in the direction as shown in FIGS. 1A and 1B, a magnetic field as shown by arrow C is induced in the first and second stationary yokes 2 and 2'. The direction of the induced magnetic field C is the same as that of a magnet field generated by the permanent magnets 1 and 6, so that the total amount of magnetic flux increases. When the current flowing through the coils 4 and 4' is reversed, the magnetic field is induced in the direction opposite to the direction shown by the arrow C, thus reducing the total amount of the magnetic flux. Therefore, the relation between the current flowing through the coils and the displacement of the movable members 5 and 6 becomes nonlinear.

On the other hand, when a current flows through coils 4-1, 4-1', 4-2, 4-2' in the direction shown in FIGS. 2A and 2B and FIGS. 3A and 3B, the movable members 5-1, 5-2, 6-1 and 6-2 are displaced in the direction of the arrow B. However, when the magnetic field (shown by the arrow C) induced at a first pair of stationary yokes 2-1 and 2-1' is parallel to the magnetic field of permanent magnets 1-1 and 6-1, the magnetic field induced at the second pair of stationary yokes 2-2 and 2-2' opposes the magnetic field (shown by arrow A-2) of permanent magnets 1-2 and 6-2. In this way, the first pair of stationary yokes and the second pair of stationary yokes compensate for each other, so that the current flowing through the coils and the displacement of the movable members becomes linear, and a great force is obtained to drive the movable members.

FIGS. 4A and 4B show one arrangement of the objective lens drive device in which the objective lens 7 is two-dimensionally displaced in the direction of the tracking error correction described above and in the direction of the optical axis of the objective lens, that is, in the direction of the focusing correction. A drive mechanism for displacing the objective lens 7 in the direction of the tracking error correction may be one of the arrangements shown in FIGS. 2A and 2B and FIGS. 3A and 3B. In this embodiment, it is the arrangement shown in FIGS. 2A and 2B.

The movable members 5-1 and 5-2 having the objective lens 7, the lens holding frame 8, and a magnetic body are movably mounted to an inner frame 11 only in the direction shown by the arrow B through a pair of leaf springs 9 and 9' which are disposed symmetrically about the optical axis of the objective lens 7. This inner frame 11 (integrally formed with an inner frame 11') is mounted to an outer frame 13 by a pair of circular springs 12 and 12' with spiral parts. Therefore, the inner frame 11 can be displaced in the direction of the optical axis of the objective lens 7. The stationary yokes 2-1, 2-1', 2-2 and 2-2' and the permanent magnets 1-1 and 1-2 which cooperate with the movable members 5-1 and 5-2 constituted by the magnetic bodies are held in the outer frame 13. The objective lens 7, the lens holding frame 8 and the movable members 5-1 and 5-2 are only mounted through the leaf springs 9 and 9' to the inner frame 11 which is movable in the direction of the optical axis, resulting in a lightweight construction. When moved in the direction of the optical axis, the stationary yokes 2-1, 2-1', 2-2, and 2-2' are displaced more than the movable members 5-1 and 5-2 in the optical axis direction, so the magnetic flux crossing the movable members 5-1 and 5-2 stays constant. In order to perform focusing by displacing the inner frames 11 and 11' in the direction of the optical axis, a coil 15 for focusing is wound around a bobbin 14 which is integrally formed with the inner frames 11 and 11'. A permanent magnetic 16, and stationary yokes 17 and 18 which cooperate with the coil are mounted to the outer frame 13.

A magnetic circuit formed by a focusing drive means as in FIGS. 4A and 4B is coaxially symmetrical about the optical axis as is apparent in the figures. Therefore, the distribution of the magnetic flux which leaks from the magnetic circuit becomes coaxially symmetrical about the optical axis. Since a frequency component which is the same as the frequency by which the recording medium rotates is mostly included in the focusing error signal component and the tracking error signal component, the respective resonant frequencies of the focusing drive means and the tracking drive means are generally set to correspond with the rotational frequency of the recording medium.

The mass (about 3 grams) of the movable portion of the focusing mechanism is greater than the mass (about 0.5 gram) of the movable portion of the tracking mechanism, so that the magnetic flux generated by the permanent magnet 16 is sufficiently greater than the magnetic flux generated by the permanent magnets 1-1 and 1-2. Therefore, as for the magnetic flux leakage, the influence of the focusing mechanism on the tracking mechanism is greater than the influence of the tracking mechanism on the focusing mechanism. The magnetic flux leakage of the focusing mechanism is coaxially symmetrical about the optical axis. On the other hand, the distribution of the magnetic flux of the tracking mechanism is symmetrical about the plane defined by the optical axis of the objective lens 7 and the longitudinal data tracks. However, the leakage of the magnetic flux from the focusing mechanism influences the tracking mechanism. The distribution of the magnetic flux of the tracking mechanism becomes asymmetrical about the plane defined by the optical axis of the objective lens 7 and the direction shown by the arrow B (For example, if the magnetic flux which passes through the stationary yokes 2-1 and 2-2 increases, the magnetic flux passing through the yokes 2-1' and 2-2' decreases).

Under this condition, assume that the objective lens 7, the lens holding frame 8, the springs 9 and 9', the inner frames 11 and 11', the bobbin 14 and the coil 15 are displaced in the focusing direction. Since these movable members are held at the outer frame 13 through the circular springs 12 and 12' with spiral parts, they are displaced from the balanced position to the direction of the optical axis of the objective lens 7 while rotating about the optical axis in direction D shown in the figure. The force is not only exerted on the movable members 5-1 and 5-2 in the direction shown by the arrow B, but it also attracts the movable members 5-1 and 5-2 to the stationary yokes 2-1, 2-1', 2-2 and 2-2'. This attractive force is not linear with respect to the distance between the movable members 5-1 and 5-2 and the stationary yokes 2-1, 2-1', 2-2 and 2-2'. The narrower the gap the greater the force exerted. The pair of leaf springs 9 and 9' which hang the movable members 5-1 and 5-2 has considerable resistance to the attractive force in this direction. However, the springs show weak resistance in the direction of torsion displacement. Therefore, when the gap distance becomes short by rotating the movable members 5-1 and 5-2 about the optical axis, the springs are attracted when the attractive force is greater than the restoring force against the torsion displacement of the leaf springs 9 and 9'. Further, since the attractive force of the stationary yokes for the plane defined by the optical axis of the objective lens 7 and the direction shown by the arrow B under the influence of the leaked magnetic flux from the focusing mechanism varies, the attractive action is increased. Therefore, correct tracking control and focusing control cannot be performed.

SUMMARY OF THE INVENTION

The object of the present invention is to eliminate the various drawbacks described above and to provide an objective lens drive device in which an objective lens can be correctly displaced perpendicularly to the optical axis and data tracks even when the objective lens is displaced in the direction of the optical axis.

The present invention provides an objective lens drive device for driving an objective lens to correct a tracking error, that is, a relative misalignment between a data track on a recording medium on which data is spirally or coaxially recorded and a readout spot which is projected on the recording medium by way of the objective lens, characterized in that an objective lens drive means is arranged at opposite sides of the objective lens for flanking the objective lens in the direction of displacement of the objective lens, the objective lens drive means including an objective lens supporting means at respective opposite sides of said objective lens and which are bent perpendicularly to the optical axis of the objective lens and the data track and which displaceably support the object lens in this perpendicular direction, movable members including magnetic bodies at respective opposite sides of the objective lens, the movable members being associated with a respective supporting means and being movable with the objective lens or a holding frame thereof, first and second stationary yokes which oppose each other and which flank the respective movable members perpendicularly to the direction of displacement of the objective lens, first and second coils which are wound around the first and second stationary yokes, respectively, and a means for generating a magnetic field passing through the first and second stationary yokes and the movable members, so that the distribution of the magnetic field of the objective lens drive means is made symmetrical about the optical axis of the objective lens, a current corresponding to a tracking error signal which represents the relative misalignment is supplied to the first and second coils of the respective objective lens drive means, and the movable members which include the magnetic bodies and the objective lens are displaced perpendicularly to the optical axis and the data track to perform tracking error correction.

The present invention further provides an objective lens drive device for driving an objective lens to correct a tracking error, that is, a relative misalignment between a data track on a recording medium on which data is spirally or coaxially recorded and a readout light spot which is projected on the recording medium by way of the objective lens, characterized in that an objective lens drive means is arranged at opposite sides of the objective lens for flanking the objective lens in the direction of displacement of the objective lens, the objective lens drive means including an objective lens supporting means at opposite sides of the objective lens and which movably support the objective lens perpendicularly to the optical axis of the objective lens and the data track, movable members including permanent magnets at respective opposite sides of the objective lens, the magnets being associated with respective supporting means and being movable integrally with the objective lens or a holding frame thereof, first and second stationary yokes which are magnetically connected and which oppose each other and which flank the respective movable members perpendicularly to the direction of displacement of the objective lens, and first and second coils which are wound around said first and second stationary yokes, respectively, said objective lens drive means generating a magnetic field passing through the first and second yokes by permanent magnets, whereby the distribution of the magnetic field of the objective lens drive means is made symmetrical about the optical axis of the objective lens, a current corresponding to a tracking error signal which represents the relative misalignment is supplied to the first and second coils of the objective lens drive means, and the movable members which include the permanent magnets and the objective lens are displaced perpendicularly to the optical axis and the data track to perform tracking error correction.

BRIEF DESCRIPTION OF THE DRAWINGS

FIGS. 1A and 1B are views illustrating a basic arrangement and principle of operation of a drive means utilized for an objective lens drive device which was previously proposed by the present applicant;

DETAILED DESCRIPTION OF THE PREFERRED EMBODIMENTS

Figure 1A:
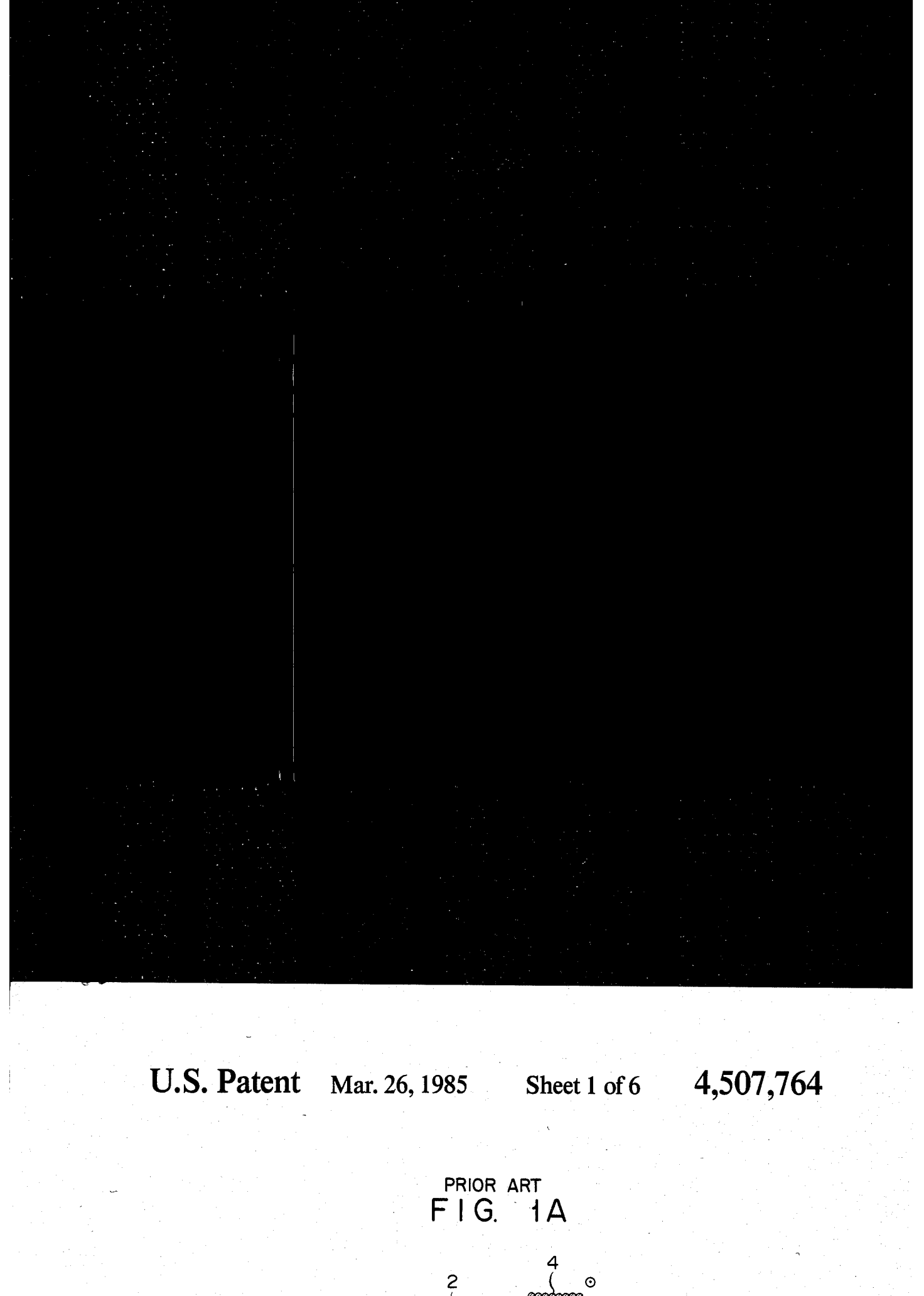
Figure 2A:
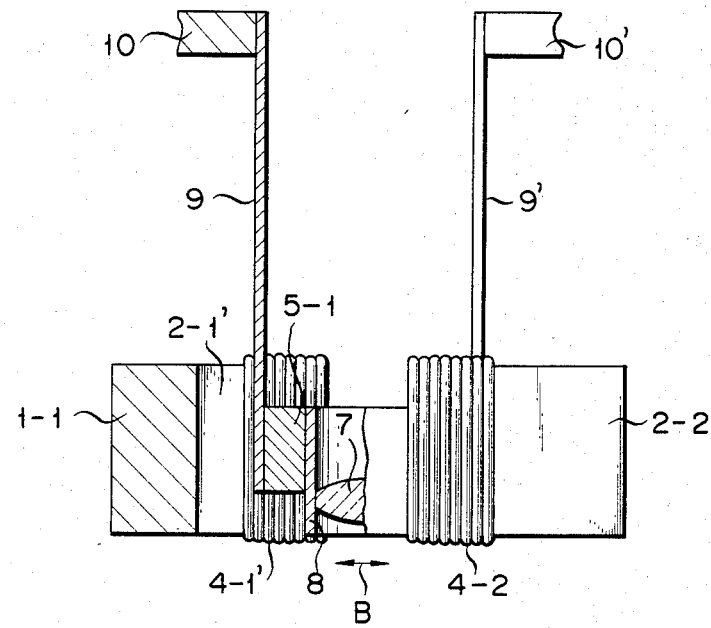
FIGS. 2A and 2B are a front view and a plan view respectively, illustrating part of one example of the objective lens drive means which was previously proposed by the present applicant.
Figure 2B:
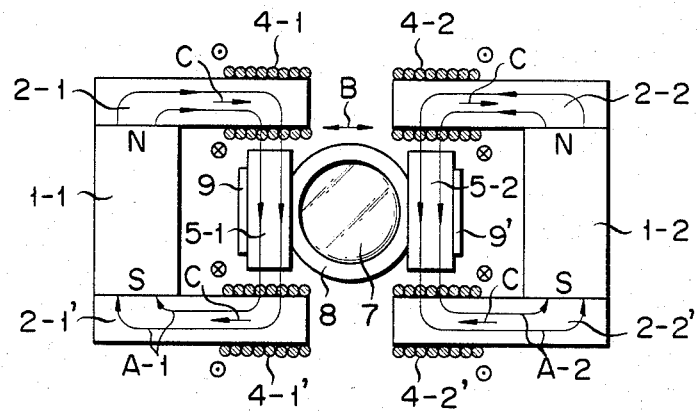
Figure 5A:
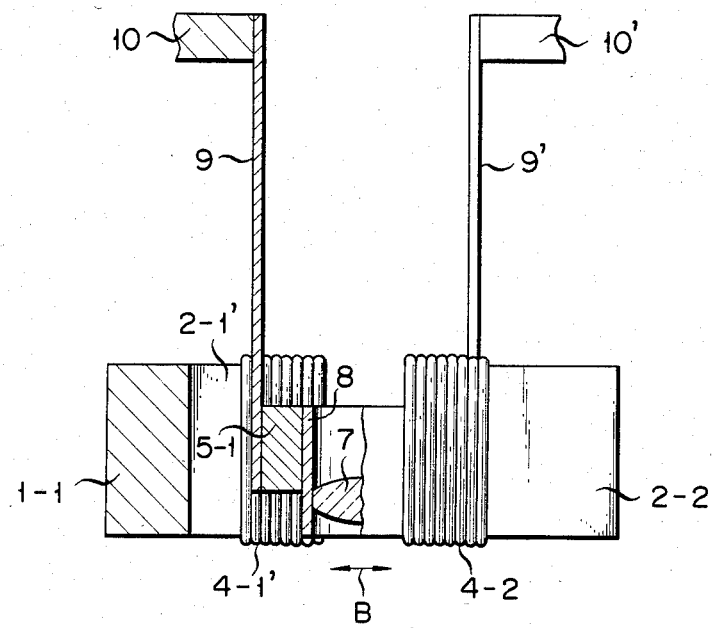
FIGS. 5A and 5B are a front view and a plan view respectively, illustrating a partial section of one embodiment of the objective lens drive device according to the present invention.
Figure 5B:
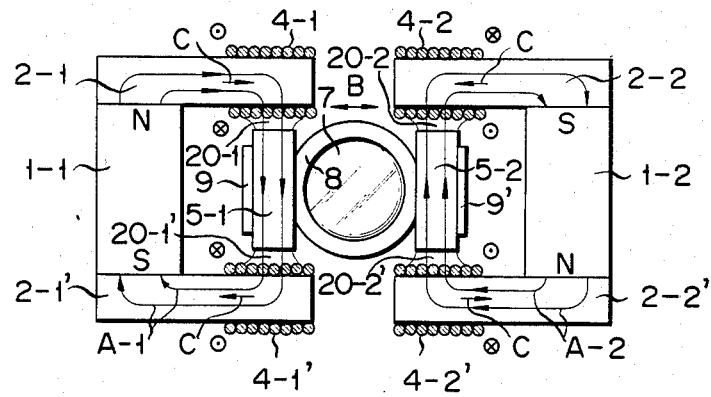

FIGS. 5A and 5B show one arrangement of an objective lens drive device according to the present invention. The objective lens drive device in this embodiment has an arrangement of a pair of objective lens drive means as shown in FIG. 1A which have a symmetrical magnetic field distribution about the optical axis of the objective lens 7 and which are disposed to flank the objective lens 7 perpendicularly to the optical axis of the objective lens 7 and the data track. The arrangement shown in FIGS. 5A and 5B is different from the arrangement shown in FIGS. 2A and 2B in that magnetic fluids 20-1, 20-1', 20-2 and 20-2' (for example, Ferrofluid by Ferrofluidics) are filled into the respective gaps between movable members 5-1 and 5-2 each comprised of a magnetic body and stationary yokes 2-1, 2-1', 2-2 and 2-2', and the current flows through first and second coils 4-2 and 4-2' of one pair of objective lens drive means in a reverse direction. The same reference numerals in FIGS. 5A and 5B designate the same parts as shown in FIGS. 2A and 2B.

Figure 3A:
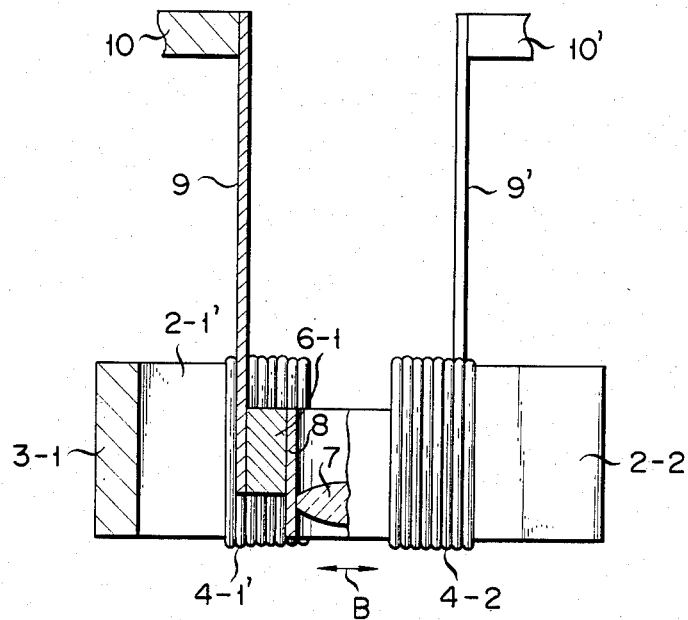
FIGS. 3A and 3B are a front view and a plan view respectively, illustrating part of another example of the objective lens drive means which was previously proposed by the present applicant.
Figure 3B:
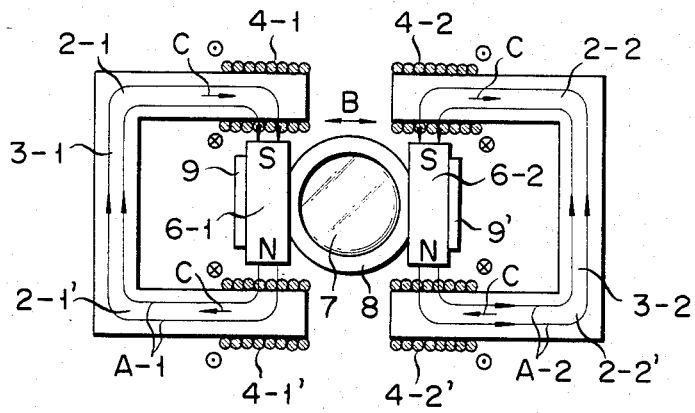
Figure 6A:
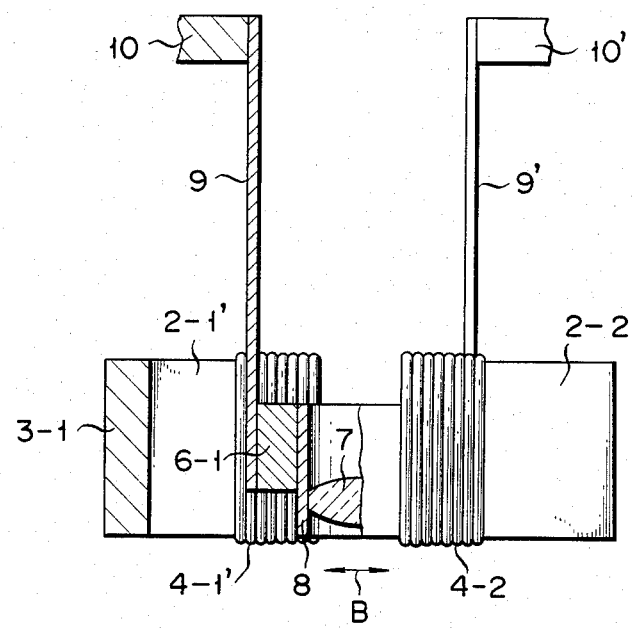
FIGS. 6A and 6B are a front view and a plan view respectively, illustrating a partial section of another embodiment of the objective lens drive device according to the present invention.
Figure 6B:
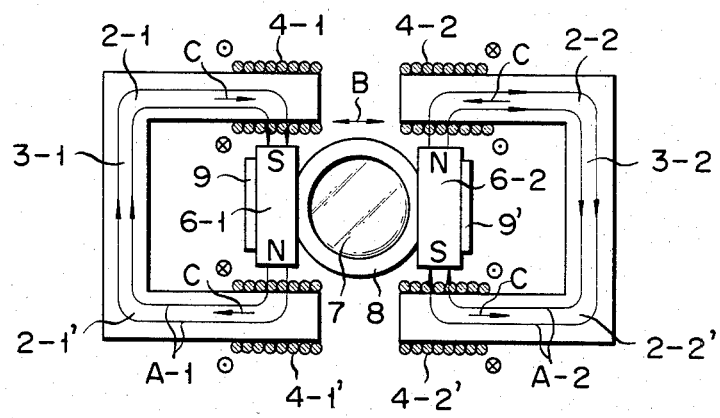

FIGS. 6A and 6B show another arrangement of an objective lens drive device according to the present invention. The objective lens drive device shown in this embodiment has an arrangement different from that shown in FIGS. 3A and 3B, except that the distribution of the magnetic field of a pair of objective lens drive means as shown in FIG. 1B is made symmetrical about the optical axis of the objective lens 7, the objective lens drive means flank the objective lens perpendicularly to the optical axis of the objective lens 7 and the data track, and a current flowing through the first and second coils 4-2 and 4-2' of one of the objective lens drive means is reversed. The same reference numerals in FIGS. 6A and 6B designate the same parts as in FIGS. 3A and 3B. In the embodiment shown in FIGS. 6A and 6B, magnetic fluid may be filled in the gaps between the movable members 6-1 and 6-2 constituted by the permanent magnets and the stationary yokes 2-1, 2-1', 2-2 and 2-2' as shown in the embodiment of FIGS. 5A and 5B. Each set of first to third yokes 2-1, 2-1', 2-2, 2-2' and 3-1, 3-2 is integrally formed. However, each yoke may first be formed separately and connected thereafter. Further, the third stationary yokes 3-1 and 3-2 may be replaced by permanent magnets as shown in FIGS. 5A and 5B.

According to the embodiment of the objective lens drive device of the present invention shown in FIGS. 5A and 5B, and FIGS. 6A and 6B as in FIGS. 2A and 2B and FIGS. 3A and 3B, magnetic fields A-1 and A-2 generated by the first pair of drive means and the second pair of drive means compensate for the magnetic flux C generated when a current flows through coils 4-1, 4-1', 4-2 and 4-2'. The relation between the current flowing through the coils 4-1, 4-1', 4-2 and 4-2' and the displacement of the movable members 5-1 and 5-2 becomes linear. Therefore, when a current is supplied to the coils 4-1, 4-1', 4-2 and 4-2' corresponding to the tracking error signal, the objective lens can be effectively displaced in the direction shown by the arrow B, that is, the direction perpendicular to the optical axis and the data track. The tracking error can be corrected with high precision. When the magnetic fluids 20-1, 20-1', 20-2 and 20-2' are filled in the gaps between the stationary yokes and the movable members, the fluids are stabilized in the gap portions due to the strong magnetic field. Therefore, the damping effect due to the viscosity of the fluids is utilized and the utilization efficiency of the gaps is used even though the gaps are widely spaced apart from each other.

Figure 4A:
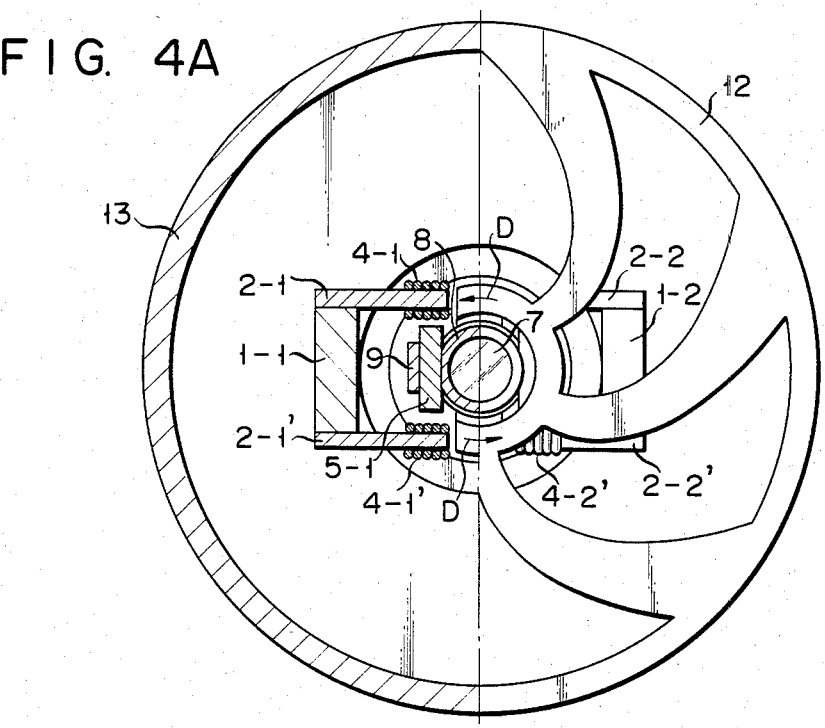
FIGS. 4A and 4B are a sectional front view and a sectional plan view respectively, illustrating part of one example of the objective lens drive device of the present invention in which the objective lens is driven two-dimensionally.
Figure 4B:
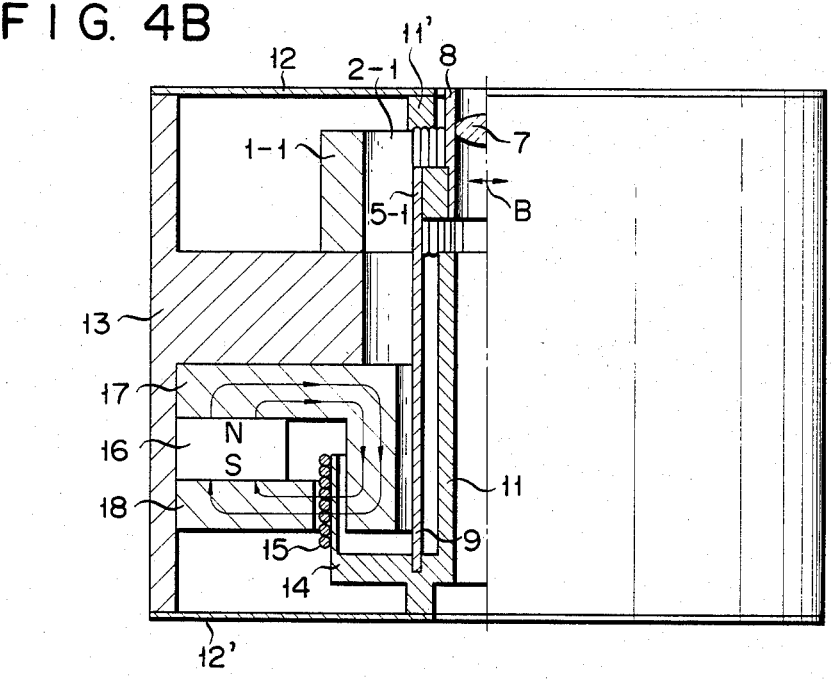

Still another embodiment according to the present invention is an arrangement in which the tracking mechanism shown in FIGS. 6A and 6B is housed in the focusing mechanism shown in FIGS. 4A and 4B. With this construction, since the leaked magnetic flux from the focusing mechanism and the distribution of the magnetic flux of the tracking mechanism are both symmetrical about the optical axis of the objective lens, the magnetic flux through the stationary yokes 2-1' and 2-2 decreases (or increases) when the magnetic flux through the stationary yokes 2-1 and 2-1' increases (or decreases) under the influence of the leaked magnetic flux. The distribution of the magnetic flux thus becomes symmetrical about the optical axis. When the objective lens 7 is displaced in the direction of the optical axis, the movable members 5-1 and 5-2, or 6-1 and 6-2 rotate in the direction shown by the arrow D in FIG. 4A. The gap distance between the stationary yoke 2-1' and the movable member 5-1 or 6-1, and between the stationary yoke 2-2 and the movable member 5-2 or 6-2 becomes short, so the gap distance between the stationary yoke 2-1 and the movable member 5-1 or 6-1 and between the stationary yoke 2-2' and the movable member 5-2 or 6-2 becomes long. However, the magnetic flux through the stationary yokes 2-1' and 2-2 on the side where the gap distance between the movable members 5-1 and 5-2, or 6-1 and 6-2, becomes short is decreased due to the influence of the magnetic flux leakage from the focusing mechanism. The magnetic flux through the stationary yokes 2-1 and 2-2' on the side where the gap distance becomes long is increased due to the influence of the magnetic flux leakage from the focusing mechanism. Thus, the distribution of the magnetic flux is still symmetrical about the optical axis. The attractive action by the stationary yokes 2-1' and 2-2 is reduced, and the movable members 5-1 and 5-2, or 6-1 and 6-2 are not attracted to the stationary yokes 2-1' and 2-2. Thus, the movable members can be effectively displaced two-dimensionally along the direction of the optical axis and the direction perpendicular to the optical axis and the longitudinal data track. Thus, tracking control and focusing control are both performed precisely. If the magnetic fluid is filled in the gaps between the movable members 5-1 and 5-2 and the stationary yokes 2-1 and 2-1 and between the movable members 6-1 and 6-2 and the stationary yokes 2-2 and 2-2', a damping effect can be used in the focusing direction when the objective lens 7 is driven two-dimensionally.

The objective lens drive device according to the present invention can be employed for a device for optically recording data wherein the distance in the radial direction of a recording medium between the position of the data track on which data is already stored and the center of the light spot which is focused on the data position on the recording medium, is maintained constant.

As described above, according to the objective lens drive device of the present invention, the relation between the current flowing through the first and second coils, corresponding to the tracking error, and the displacement of the objective lens becomes linear so that accurate tracking error correction can be performed and a sufficient displacing force can be obtained. The device according to the present invention becomes compact and light in weight. Further, since the distribution of the magnetic field of the pair of drive means which are disposed to oppose to each other through the objective lens is made symmetrical about the optical axis of the objective lens, the objective lens can be displaced in two dimensions. Further, when magnetic fluid is filled in the gaps between the stationary yokes and the movable members, the damping characteristic is greatly improved.

What is claimed is:

1. In an objective lens drive device for driving an objective lens to correct a tracking error between a data track on a recording medium on which data is spirally or coaxially recorded and a readout spot which is projected on the recording medium by way of the objective lens, the improvement comprising;

an objective lens drive means at respective opposite sides of said objective lens for flanking said objective lens in the direction of displacement of said objective lens, said objective lens drive means including:

objective lens supporting means at respective opposite sides of said objective lens and which are bent perpendicularly to the optical axis of said objective lens and said data track and which displaceably support said objective lens in said perpendicular direction, movable members including magnetic bodies at respective opposite sides of said objective lens, said movable members being associated with a respective supporting means and being movable with said objective lens, first and second stationary yokes which oppose each other and which flank respective movable members perpendicularly to the direction of displacement of said objective lens, first and second coils which are wound around said first and second stationary yokes, respectively, and means for generating a magnetic field passing through said first and second stationary yokes and said movable members such that the direction of magnetic flux passing through one of said movable members is opposite to that of the magnetic flux passing through the other of said movable members;

the elements of said objective lens drive means being arranged so that the distribution of the magnetic field of said objective lens drive means is symmetrical about the optical axis of said objective lens; and a source of current, corresponding to a tracking error signal which represents the relative misalignment, coupled to said first and second coils of said objective lens drive means, whereby the movable members which include said magnetic bodies and said objective lens are displaced perpendicularly to the optical axis and said data track to perform tracking error correction.

2. An objective lens drive device according to claim 1, comprising a focusing mechanism which has a magnetic circuit which is disposed coaxially with the optical axis of said objective lens and whose magnetic flux is symmetrically distributed around the optical axis, second supporting means having one end connected to said objective lens or said holding frame thereof and said movable members through said supporting member and the other end connected to said stationary members, which displaceably supports said objective lens along the optical axis of said objective lens, and means for rotating said objective lens or said holding frame thereof and said movable members in a predetermined direction about the optical axis while displacing said objective lens or said holding frame thereof and said movable members along the optical axis wherein first and second stationary yokes of first and second coils of said respective objective lens drive means and means for generating a magnetic field which passes through said first and second stationary yokes are mounted to said movable members whereby said objective lens can be accurately displaced perpendicularly to the optical axis and the data track even when said objective lens is displaced along the optical axis.

3. An objective lens drive device according to claim 1 or 2, wherein a magnetic fluid is filled in a gap between said movable members and said first and second stationary yokes around which are wound said first and second coils of said objective lens drive device.

4. An objective lens drive device according to claim 1 or 2, wherein the relation between the current flowing through said first and second coils, and the displacement of said movable members and objective lens, is linear.

5. An objective lens drive device for driving an objective lens to correct a tracking error between a data track on a recording medium on which data is spirally or coaxially recorded and a readout light spot which is projected on the recording medium by way of the objective lens, comprising:

an objective lens drive means arranged at opposite sides of said objective lens for flanking said objective lens in the direction of displacement of said objective lens, said objective lens drive means including:

objective lens supporting means at respective opposite sides of said objective lens and which movably support said objective lens perpendicularly to the optical axis of said objective lens and said data track, movable members including permanent magnets at respective opposite sides of said objective lens, said permanent magnets being associated with a respective supporting means and being movable integrally with said objective lens, first and second stationary yokes which are magnetically connected and which oppose each other and which flank respective movable members perpendiculary to the direction of displacement of said objective lens, and first and second coils which are wound around said first and second stationary yokes, respectively, said permanent magnets of said movable members generating a magnetic field passing through said first and second yokes such that the direction of magnetic flux passing through one of said movable members is opposite to that of the magnetic flux passing through the other of said movable members;

the elements of said objective lens drive means being arranged such that the distribution of the magnetic field of said objective lens drive means is symmetrical about the optical axis of said objective lens; and a source of current, corresponding to a tracking error signal which represents the relative misalignment, coupled to said first and second coils of said objective lens drive means, whereby said movable members which include said permanent magnets and said objective lens are displaced perpendicularly to the optical axis and said data track to perform tracking error correction.

6. An objective lens drive device according to claim 5, comprising a focusing mechanism which has a magnetic circuit which is disposed coaxially with the optical axis of said objective lens and whose magnetic flux is symmetrically distributed around the optical axis, second supporting means having one end connected to said objective lens or said holding frame thereof and said movable members through said supporting member and the other end connected to said stationary members, which displaceably supports said objective lens along the optical axis of said objective lens, and means for rotating said objective lens or said holding frame thereof and said movable members in a predetermined direction about the optical axis while displacing said objective lens or said holding frame thereof and said movable members along the optical axis wherein first and second stationary yokes of first and second coils of said respective objective lens drive means are mounted to said movable members whereby said objective lens can be accurately displaced perpendicularly to the optical axis and the data track even when said objective lens is displaced along the optical axis.

7. An objective lens drive device according to claim 5 or 6, wherein a magnetic fluid is filled in a gap between said movable members and said first and second stationary yokes around which are wound said first and second coils of said objective lens drive device.

8. An objective lens drive device according to claim 5 or 6, wherein the relation between the current flowing through said first and second-coils, and the displacement of said movable members and objective lens, is linear.

* * * * *